United States Patent [19]

Johnson et al.

[11] 4,243,309

[45] Jan. 6, 1981

[54] WALKING BEAM LATCH AND LENS DISC ACTUATOR ARRANGEMENT

[75] Inventors: Bruce K. Johnson, Andover; George D. Whiteside, Lexington, both of Mass.

[73] Assignee: Polaroid Corporation, Cambridge, Mass.

[21] Appl. No.: 17,196

[22] Filed: Mar. 5, 1979

[51] Int. Cl.³ .................. G03B 3/00; G03B 17/30
[52] U.S. Cl. ................................. 354/197; 354/266
[58] Field of Search ............... 354/266, 268, 195, 197, 354/247

[56] References Cited

U.S. PATENT DOCUMENTS

| | | | |
|---|---|---|---|
| 2,229,939 | 1/1941 | Service | 172/36 |
| 3,056,053 | 9/1962 | Fink | 310/41 |
| 3,179,216 | 4/1965 | Tetro | 192/4 |
| 3,220,269 | 11/1965 | Gennaro | 74/88 |
| 3,925,797 | 12/1975 | Ettischer | 354/197 |
| 4,103,993 | 8/1978 | Winkler | 352/140 |
| 4,167,316 | 9/1979 | Johnson | 354/195 |

FOREIGN PATENT DOCUMENTS 558820   9/1932   Fed. Rep. of Germany .

Primary Examiner—Richard A. Wintercorn
Assistant Examiner—S. D. Schreyer
Attorney, Agent, or Firm—Edward S. Roman

[57] ABSTRACT

A fully automatic and integrated focusing and exposure control system for a photographic camera includes a combination latch and actuator mechanism that operates to normally latch a shutter blade arrangement in its scene light blocking position and to unlatch the shutter blade arrangement in anticipation of an exposure cycle. The combination latch and actuator mechanism also operates during the unlatching of the shutter blades to actuate the focusing apparatus so as to automatically focus the camera objective lens in synchronism with the shutter blade being unlatched.

7 Claims, 10 Drawing Figures

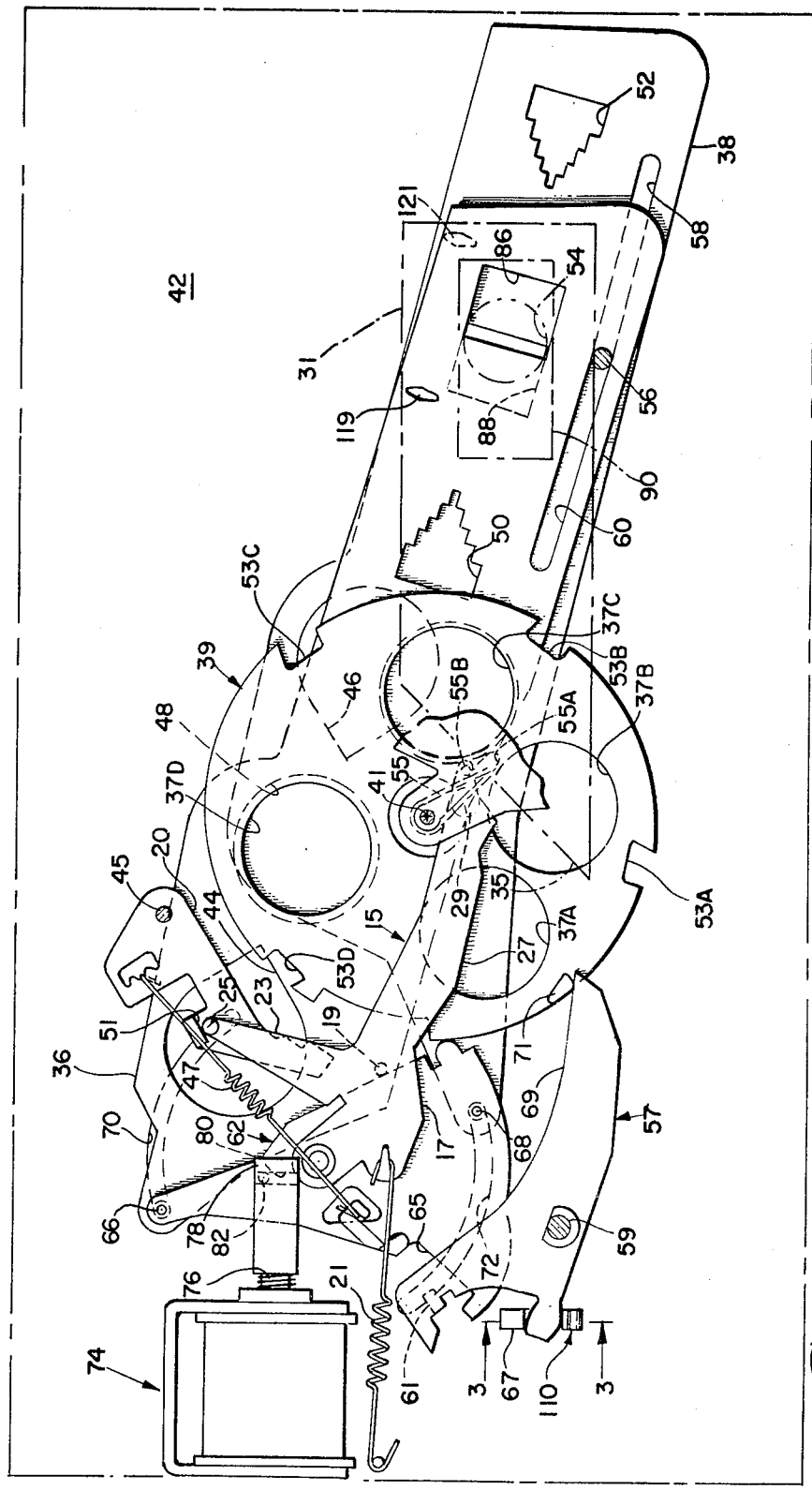
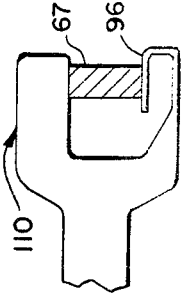
FIG. 3A
FIG. 3

WALKING BEAM LATCH AND LENS DISC ACTUATOR ARRANGEMENT

BACKGROUND OF THE INVENTION

1. Field of the Invention

This invention relates generally to an integrated automatic focusing and exposure control apparatus and, more particularly, to an integrated focusing and exposure control apparatus comprising a combination latch and actuator mechanism for latching the exposure control apparatus and actuating the focusing apparatus.

2. Description of the Prior Art

Ultrasonic ranging systems are well known for cameras, and in each of the systems ultrasonic energy is transmitted toward a subject to be photographed and the subject reflects the ultrasonic energy back to the camera. Characteristics of the transmitted and received signals may be compared to derive a control signal representative of the subject distance. The control signal can be thereafter used to drive the lens mount of the camera to a position corresponding to the subject distance whereby the subject will be in focus.

U.S. patent application Ser. No. 840,802 entitled "Ultrasonic Ranging System for a Camera" by J. Muggli filed in common assignment herewith provides an ultrasonic ranging system for a camera having a lens mount movable to a position at which a subject being photographed is in focus. The system includes an ultrasonic transducer that responds to a keying pulse by transmitting a relatively short burst of frequency modulated ultrasonic energy and a synchronized receiver for processing an echo signal produced by the transducer upon receipt of an echo upon a predetermined time interval. The receiver produces a range signal with a characteristic related to the distance of a subject being photographed from the camera. The range signal representing the subject distance may thereafter be used in a manner as is more fully disclosed in U.S. patent application Ser. No. 916,114 entitled "Automatic Focusing Camera", filed June 16, 1978 in common assignment herewith to control a gated pulse generator in a nonlinear manner such that the latter produces a train of pulses whose number is representative of the actual position of the lens mount at which the subject will be in focus, and includes a focusing mechanism having means responsive to the pulse produced by the pulse generator means for displacing the lens mount to the proper position. Such systems are complex and expensive since the range signal must be utilized to control a gated pulse in a nonlinear manner to produce a train of pulses whose number is representative of the actual position of a lens mount. The focusing mechanism must then embody a servo-mechanism to respond to the pulses produced by the pulse generator in order to mechanically displace the lens mount to the proper axial position thereby further contributing to the complex nature of such auto focus arrangements.

A simplified automatic sonar controlled focusing apparatus wherein the objective lens movement occurs in an elapsed time interval which is directly proportional to the elapsed time interval between which the sonar ranging signal is transmitted and thereafter received subsequent to being reflected by the photographic subject as is more fully described in U.S. patent application Ser. No. 919,084, entitled "Sonar Controlled Lens Focus Apparatus", by B. Johnson et al., filed June 26, 1978 in common assignment herewith.

The preferred objective lens arrangement comprises a plurality of lens elements mounted for displacement between a plurality of focal positions by a lens holding disc member disposed for rotation about a fixed center axis. The plurality of lens elements are disposed on the lens holding disc member in circumferentially spaced-apart relation with respect to each other about the center axis. Exposure control is provided by a scanning shutter blade arrangement including a pivotally disposed walking beam for imparting counter reciprocal sliding movement to the shutter blade elements. The walking beam is pivotally disposed to impact upon an actuator member which, in turn, operates by way of a torsion spring to impact upon the lens holding disc member and thereby rotate the lens holding member so as to sequentially move each of the lens elements into the focal position. The shutter blade arrangement also includes a latch mechanism for holding the shutter blade elements in the scene light blocking position prior and subsequent to the exposure interval. Although the aforementioned focusing and exposure control apparatus functions in an entirely satisfactory manner, it is nevertheless advantageous to integrate and simplify the aforementioned focusing and exposure control apparatus to the fullest extent possible. Therefore it is a primary object of this invention to provide a simpler and better integrated focusing and exposure control apparatus of the aforementioned type.

It is a further object of this invention to provide a simple and integrated focusing and exposure control apparatus including a combination latch and actuator member for latching the exposure control apparatus and actuating the focusing apparatus.

SUMMARY OF THE INVENTION

A camera is provided with a fully automatic and integrated focusing and exposure control apparatus as follows. The focusing apparatus comprises a plurality of discrete lens elements each having a different focal length together with means for holding the plurality of lens elements in circumferentially spaced-apart relation with respect to each other for rotation about a center axis. Rotation of the lens holding means from an initial position operates to sequentially move each of the lens elements into position to focus an image onto the camera focal plane of a photographic subject located at a different camera-to-subject distance.

The exposure control apparatus comprises a blade mechanism together with means for mounting the blade mechanism for movement between one arrangement in which the blade mechanism blocks scene light from being transmitted to the film plane and another arrangement in which the blade mechanism unblocks the passage of scene light to the film plane. Actuable drive means are provided for displacing the blade mechanism between its one and other positions to define a photographic exposure interval.

The focusing and exposure control apparatus are integrated by a mechanism for both latching the blade mechanism in its scene light blocking arrangement and rotatably driving the lens holding means to sequentially move each of the lens elements into its focus position. The blade latching and lens driving mechanism is movable from one blade mechanism latching position to another blade mechanism unlatching position to enable the drive means to displace the blade mechanism from its scene light blocking arrangement to its scene light unblocking arrangement to define the exposure interval. Such movement of the blade latching and lens driving mechanism from its blade mechanism latching position to its blade mechanism unlatching position simultaneously operates to actuate the lens holding means so as to rotatably drive the lens holding means to sequentially move each of the lens elements into its focus position.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 3 is a cross-sectional view taken along the lines 3—3 in FIG. 3A;

FIG. 3A is a front elevational view showing portions of the shutter blade mechanism of FIG. 2 at a different position;

DESCRIPTION OF THE PREFERRED EMBODIMENT

Figure 1:
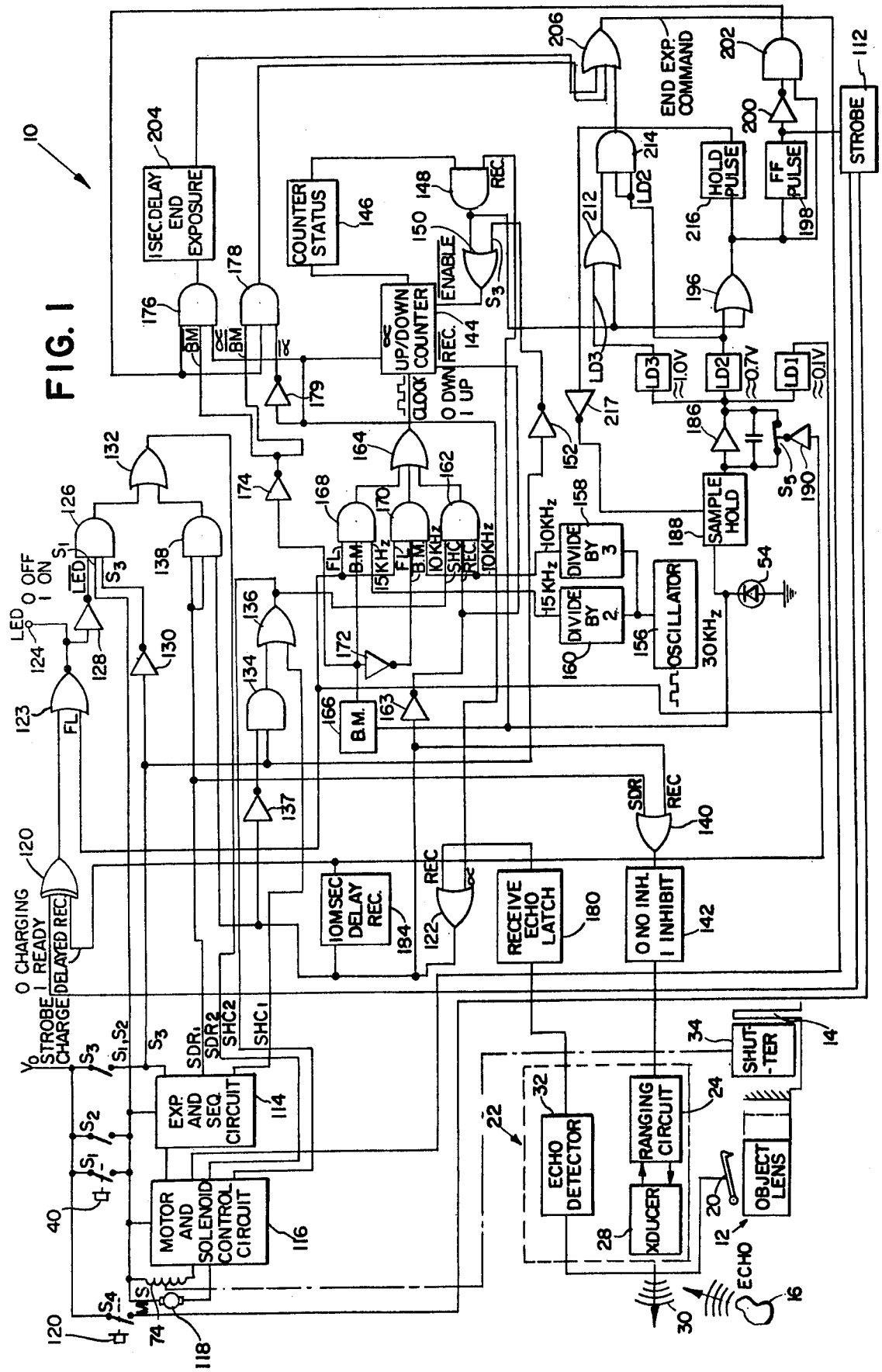
FIG. 1 is a schematic circuit diagram of the photographic control system and apparatus of this invention.

Referring now to FIG. 1 there is shown at 10, a schematic circuit diagram for the photographic camera apparatus of this invention. The camera apparatus 10 includes an objective lens arrangement or assembly, as shown in simplified fashion at 12, disposed for movement between a plurality of different focal positions. During each film exposure operation, the objective lens assembly 12 is displaced to one of its focal positions for focusing at a focal plane 14, image forming light rays from a respective photographic subject as shown at 16 located within a given range of distances from the camera apparatus. As is readily apparent, the lens assembly 12 is adapted at each of its plurality of focal positions to focus at the focal plane 14 of the camera, an image of a photographic subject located at a different distance from the camera within the given range of distances.

The lens assembly 12 is preferably driven through its plurality of different focal positions in a manner to be subsequently described in greater detail herein and may be held at anyone of its different focal positions by a releasable lens pawl 20 which will also be described in greater detail herein. The lens assembly 12 while in its initial terminal position operates to focus image forming light rays from a photographic subject located at the closest possible distance to the camera within the aforementioned camera-to-subject distance range and while in its other terminal position (phantom lines) operates to focus image-forming light rays from a photographic subject located at the furthest possible distance from the camera within the aforementioned camera-to-subject distance range. The movement of the lens assembly 12 from its initial terminal position toward its other terminal position operates to progressively focus image-forming rays for corresponding subjects located at progressively increasing distances from the camera.

The photographic apparatus 10 is also provided with a sonic rangefinder as shown generally at 22 and which is more fully disclosed in copending U.S. patent applications Ser. Nos. 840,802 entitled "Ultra-sonic Ranging System For a Camera" by J. Muggli and Ser. No. 919,084 entitled "Sonar Controlled Lens Focus Apparatus" by B. Johnson, et al filed June 26, 1978 in common assignment herewith. The sonic rangefinder 22 includes a ranging circuit 24 which may be actuated in a manner to be herein described to issue a transmit commence signal to a sonic transducer 28 so as to cause the transmission of a sonar ranging signal comprising a burst of sonic energy as shown at 30. The transducer 28 thereafter operates to detect an echo signal reflected from the photographic subject 16 at an elapsed time interval subsequent to the transmission of the sonar ranging signal. An echo detector 32 then provides a signal indicative of this elapsed time period which corresponds directly to the distance between the camera and the subject 16 to be photographed. Thus, the sonic rangefinder 22 provides an indication of an elapsed time period which corresponds directly to the distance between the camera and the subject to be photographed for reasons which will become more apparent in the following paragraphs.

Intermediate the objective lens arrangement 12 and the focal plane 14, there is provided a shutter mechanism that is shown generally at 34 comprising two overlapping shutter blade elements 36 and 38 (see FIGS. 2-4) of the so-called scanning type which will be subsequently described in greater detail herein. The photographic camera apparatus is also provided with a photographic cycle initiating button as shown at 40 in FIG. 1 wherein the depression of the button 40 operates to commence an exposure interval by ultimately effecting the release of the shutter blade elements 36 and 38 in a manner to be subsequently described herein.

Figure 2:
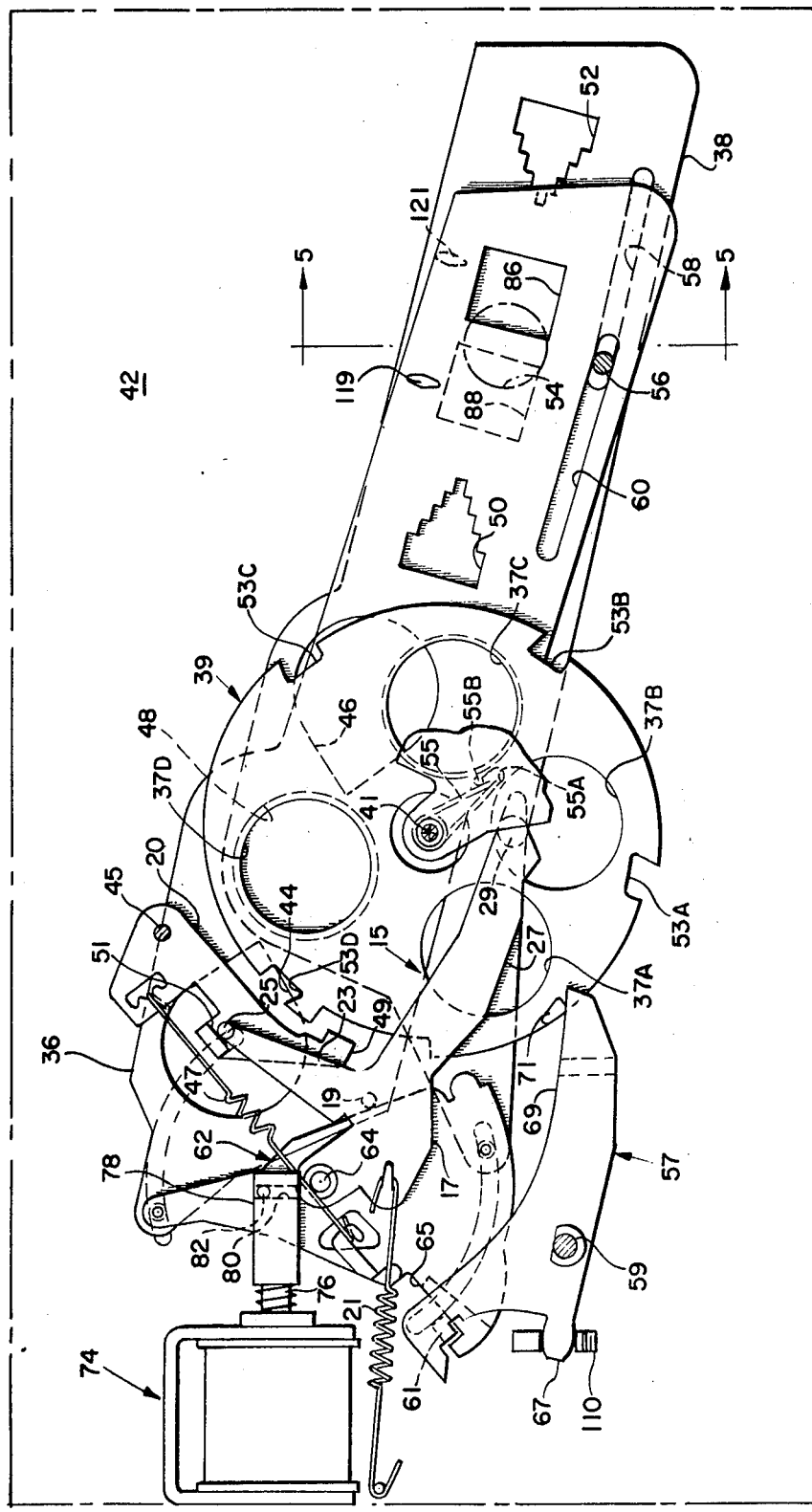
FIG. 2 is a front elevational view showing portions of the shutter blade mechanism of FIG. 1.
Figure 3B:
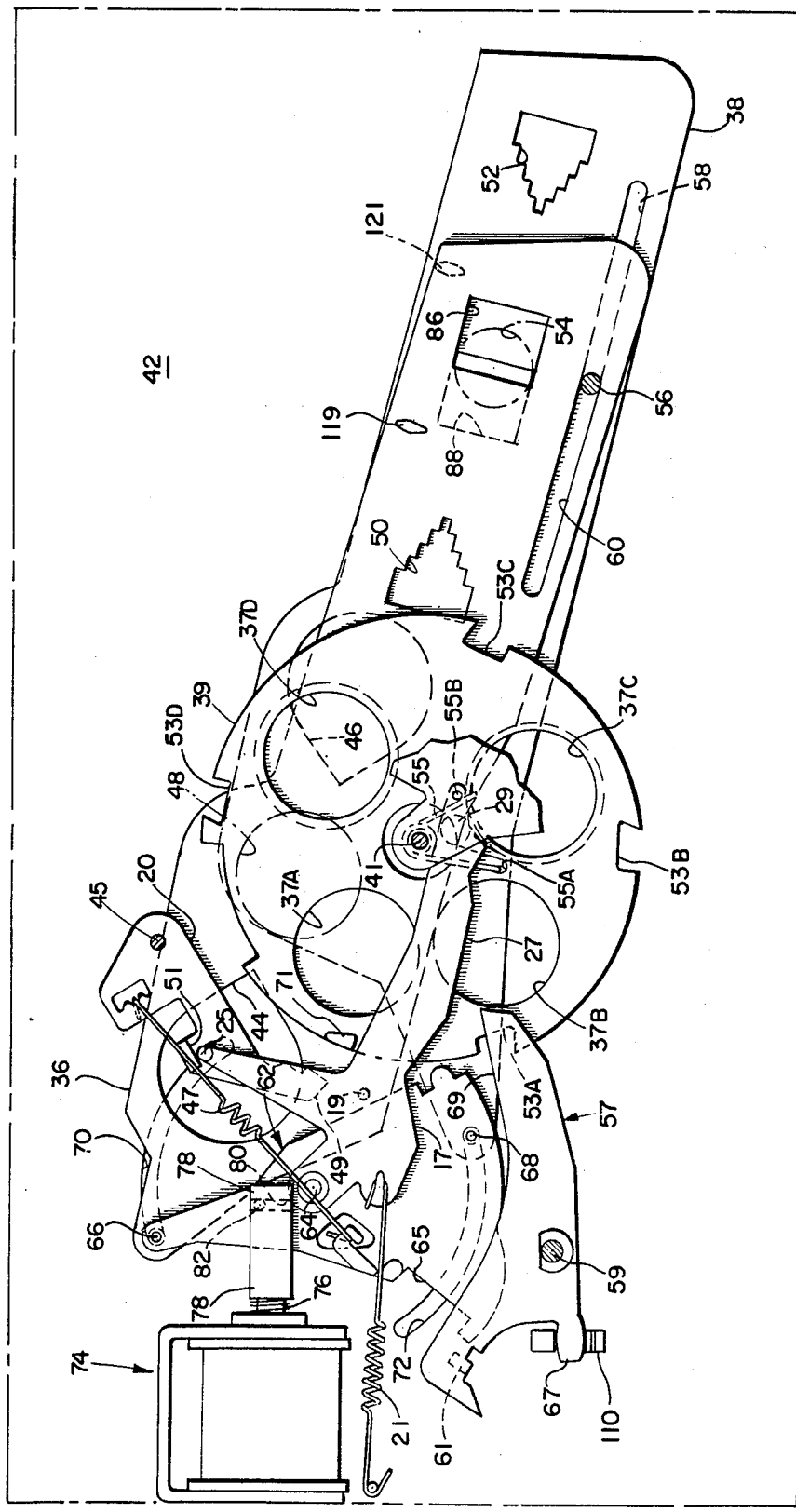
FIG. 3B is a front elevational view showing portions of the shutter blade mechanism of FIG. 2 in still another position.
Figure 4:
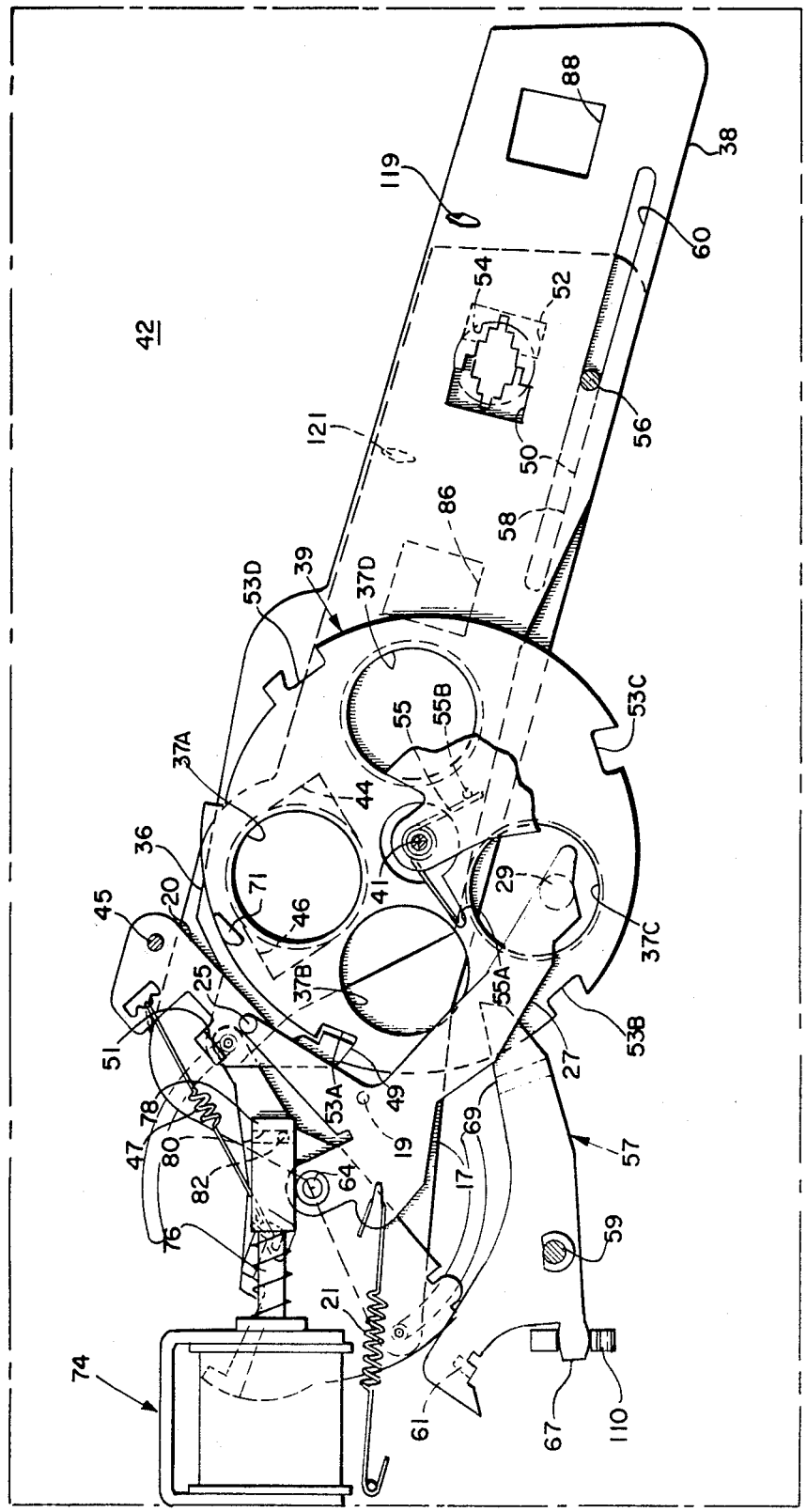
FIG. 4 is a front elevational view showing portions of the shutter blade mechanism of FIG. 2 in still another position.

Referring now to FIGS. 2-4, it can be seen that a pair of scene light admitting primary apertures 44 and 46 are provided respectively in the blade elements 36 and 38 to collectively define a progressive variation of effective aperture openings in accordance with simultaneous longitudinal and lateral displacement of one blade element with respect to the other blade element in a manner as is fully described in U.S. Pat. No. 3,942,183 entitled "Camera with Pivoting Blades" by George D. Whiteside, issued Mar. 2, 1976 and assigned in common herewith. The apertures 44 and 46 are selectively shaped so as to overlap a light entering exposure opening 48 in a baseblock casting 42 thereby defining a gradually varying effective aperture size as a function of the position of the blade elements 36 and 38.

Figure 5:
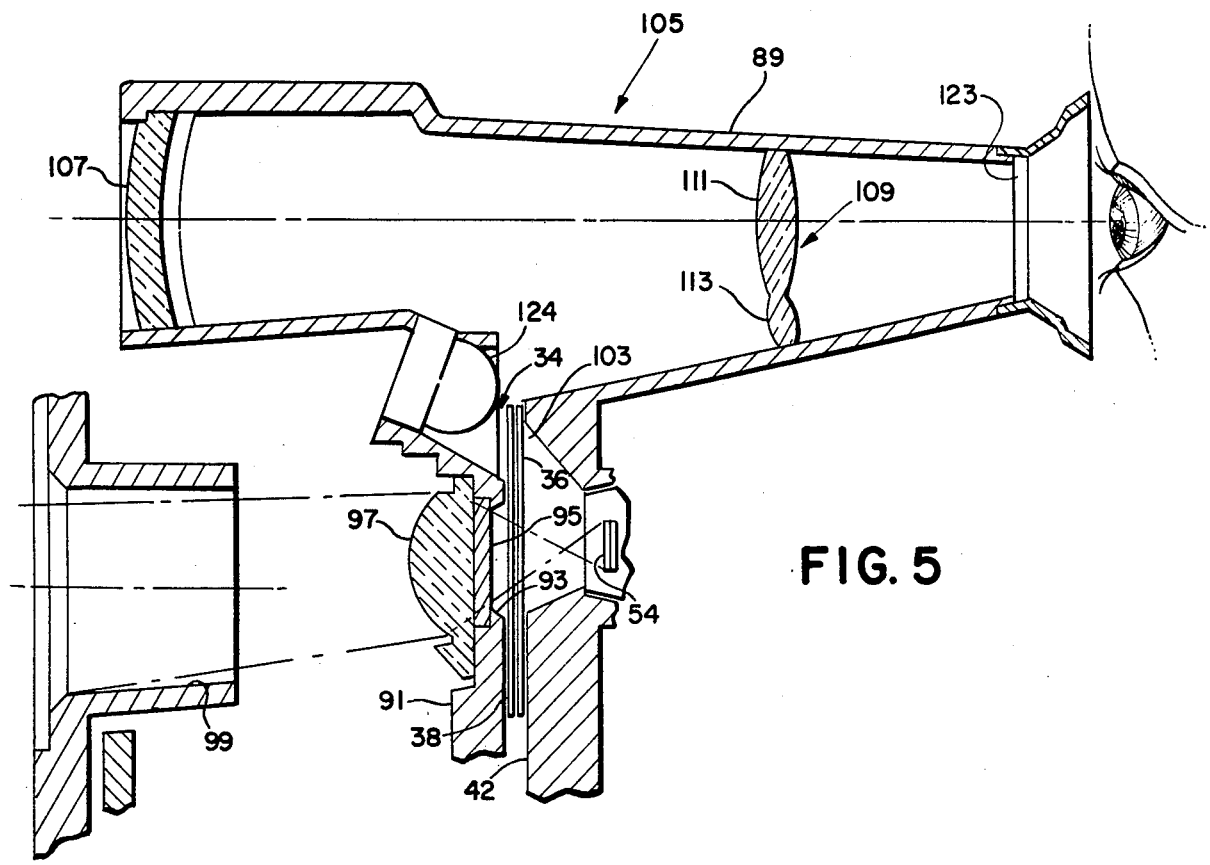
FIG. 5 is a cross-sectional view taken along the lines 5—5 of FIG. 2.

Each of the blades 36 and 38 may additionally be configured to have corresponding photocell sweep secondary apertures shown respectively at 50 and 52. Secondary apertures 50 and 52 may be configured in correspondence with the shapes of scene light admitting primary apertures 44 and 46. As is readily apparent, the secondary apertures 50 and 52 also move in correspondence with the primary apertures 44 and 46 to define a small secondary aperture for admitting the passage of scene light to a light detecting or photoresponsive element 54 stationed in the base block as best seen in FIG. 5.

Projecting from the baseblock casting 42 at a location spaced laterally apart from the light entering exposure opening 48, is a pivot pin or stud 56 which pivotally and translatably engages elongated slots 60 and 58 formed in respective shutter blade elements 36 and 38. Pin 56 may be integrally formed with the baseblock casting 42 and blade elements 36 and 38 may be retained in engaging relation with respect to the pin 56 by any suitable means such as peening over the outside end of the pin 56.

The opposite ends of the blade elements 36 and 38 respectively include extended portions which pivotally connect to a walking beam 62. The walking beam 62, in turn, is disposed for rotation relative to the baseblock casting 42 by pivotal connection to a projecting pivot pin or stud 64 which may be integrally formed with the baseblock casting 42 at a location spaced laterally apart from the light entry exposure opening 48. The walking beam 62 may be pivotally retained with respect to the pin 64 by any conventional means. In the preferred mode, the walking beam 62 is pivotally connected at its distal ends to the shutter blade elements 36 and 38 by respective pin members 66 and 68 which extend laterally outward from the walking beam 62. Pin members 66 and 68 are preferably circular in cross-section and extend through respective openings in respective blade elements 36 and 38 so as to slidably engage respective arcuate tracks 70 and 72 which may be integrally formed within the baseblock casting 42. The arcuate tracks 70 and 72 operate to inhibit disengagement of the blade elements 36 and 38 from their respective pin members 66 and 68 during operation of the exposure control system. Thus, the walking beam 62 and shutter blade elements 36 and 38 collectively define a blade mechanism together with a means for mounting the blade mechanism for displacement including pivot pins 56 and 64.

Drive means are provided for displacing the blade mechanism 34 and include an accelerator assembly as shown generally at 15 and a tractive electromagnetic device such as a solenoid as shown generally at 74 for displacing the shutter blade elements 36 and 38 with respect to each other and the baseblock casting 42 in a manner to be subsequently described herein. The accelerator assembly 15 comprises an accelerator member 17 preferably disposed for coaxial rotation with respect to the walking beam 62. The accelerator member 17 includes an integral depending pin portion 19 extending laterally outward therefrom into the locus of travel of the walking beam 62. A tension spring 21 which is fixedly connected at one end to the baseblock casting 42 and at its other end to the accelerator member 17 operates to yieldably bias the accelerator member 17 to rotate in a clockwise direction so as to urge the pin portion 19 into engagement with the edge of the walking beam 62.

The solenoid 74 includes an internally disposed cylindrical plunger unit 76 which retracts inwardly into the body of the solenoid upon the energization of the solenoid winding. The solenoid plunger 76 includes an end cap 78 at the outside end thereof together with a vertical slot or groove 80 within the end cap 78 for loosely engaging the pin 82 extending outwardly from the walking beam 62. In this manner, the solenoid plunger 76 is affixed to the walking beam 62 so that longitudinal displacement of the plunger 76 operates to rotate the walking beam 62 around the pivot pin 64 so as to displace the shutter blades 36 and 38.

The accelerator member 15 includes a first integral depending arm portion 23 extending outwardly therefrom to define an integral pin portion 25 at the outside end thereof. The pin portion 25 engages an integral right angle tab portion 51 from the lens pawl 20 for reasons which will become more apparent from the following discussion. The accelerator member 17 additionally includes a second integral depending arm portion 27 which extends outwardly to define an integral pin portion 29 at the outside end thereof. The pin portion 29 engages a profile cam 35 at one end of a variable trim member 31 (FIG. 3A) which is disposed for reciprocal sliding translation with respect to the baseblock 42 in a well-known manner. The trim member 31 includes a manually actuable handle (not shown) which extends from the camera housing and is accessible to the photographer in order to provide him with a degree of overriding personal control through which he may slightly vary the exposure in order to accommodate for varying conditions in the ambient scene lighting in a manner as is more fully described in U.S. patent application Ser. No. 965,491 entitled "Shutter and Trim Apparatus", by B. Johnson et al., filed Dec. 1, 1978 in common assignment herewith. The trim member 31 is also preferably provided with a variable density filter 90 which overlaps the photoresponsive element 54 to provide a further degree of personal overriding control in a manner as is more fully described in U.S. Pat. No. 4,007,468 entitled "Trim Control Apparatus for Photographic Exposure Control System", by I. Blinow, issued Feb. 8, 1977 in common assignment herewith.

The shutter blade elements 36 and 38 are respectively provided with a third set of apertures 86 and 88 as is more fully described in U.S. patent application Ser. No. 854,691 entitled "An Exposure Control System for Use in a Photographic Camera", by B. Johnson, issued Nov. 25, 1977 filed in common assignment herewith. The third pair of apertures 86 and 88 overlap each other to provide an aperture of predetermined value that is aligned with the photoresponsive element 54 so as to permit passage of light from the scene to impinge upon the photoresponsive element 54 when the shutter blades 36 and 38 are moved to the positions as shown in FIGS. 3A and 3B in a manner to be more fully described in the following paragraphs.

In order that the shutter blade elements 36 and 38 may be maintained in their scene light blocking arrangement without requiring the continuous energization of the solenoid 74, there is provided a combined walking beam latch and lens actuator member 57 disposed for rotation about a pivot pin or shaft 59 which may be integrally molded with respect to the baseblock casting 42. The latch and actuator member 57 includes a laterally projecting integrally molded tooth or tang 61 which extends into the locus of travel of the walking beam 62 to engage an edge 65 thereof thereby inhibiting clockwise rotation of the walking beam 62. The latch and actuator member 57 also includes a depending arm portion 67 engaged by the end of an actuator arm 110 which generally defines a yoke with one side of the yoke comprising an integral spring finger 96 (FIG. 3).

The actuator arm 110 is moved downwardly and then upwardly in a manner as is more fully described in U.S. Pat. No. 4,040,072 entitled "Shutter Latch Arrangement Releasable Through Shutter Blade Actuation and Resettable Through Film Advancement", by B. Johnson et al., issued Aug. 2, 1977, and operates to first impart counter-clockwise and then clockwise rotation to the latch and actuator member 57 in a manner as will be more fully described herein.

In its preferred embodiment, the aforementioned objective lens arrangement 12 comprises a plurality of lens elements 37A through 37D. A disk-like lens holding member 39 disposed for rotation about a center pivot pin or axis 41 which may also project outwardly from the baseblock casting 42 provides means for mounting the plurality of lens elements 37A through 37D. The plurality of lens elements 37A through 37D are disposed on the lens holding member 39 in circumferentially spaced-apart relation with respect to each other about the pivot pin 41. Each of the lens elements 37A through 37D has a different focal length and depth of field characteristic and corresponds respectively to a different one of the aforementioned plurality of focal positions. As is readily apparent, rotation of the lens holding member 39 about the pivot pin 41 operates to sequentially move each of the lens elements 37A through 37D into position overlying the exposure opening 48 in the baseblock casting 42 so as to sequentially focus images onto the focal plane 14 of the camera of photographic subjects located at progressively increasing distances from the camera. As will be readily understood by those skilled in the art, additional lens elements (not shown) may be provided in fixed optical alignment with the exposure opening 39 to cooperate with the lens elements 37A through 37D in defining the objective lens arrangement 12 for the camera. Thus, one of the lens elements 37A through 37D may be entirely omitted with an open space provided in its place whereupon the additional lens elements provided in optical alignment with the exposure opening 48 would operate by themselves to define the camera objective when the open space is rotated over the exposure opening 39. Thus, the lens elements 37A through 37D would preferably be relatively weak in comparison with the other lens elements (not shown) in optical alignment therewith.

The aforementioned latch and actuator member 57 includes a leading edge portion 69 which engages an integral pin 71 extending laterally outward from the lens holding member 39 so as to enable the latch and actuator member 57 to rotatably drive the lens holding member 39 about its center pivot pin 41 in concert with the unlatching of the walking beam 62 in a manner to be more fully described in the following discussion.

The lens pawl 20 is disposed for rotation about a pivot pin or axis 45 which may be integrally formed with respect to the baseblock casting 42 and is yieldably biased for rotation about the pivot pin 45 in a counter-clockwise direction by means of a tension spring 47 interconnected between the walking beam 62 and lens pawl 20. The lens pawl 20 also includes an integral depending tang portion 49 for respective engagement in one of a plurality of notches 53A through 53D disposed in circumferentially spaced-apart relation about the periphery of the lens holding member 39. A torsion spring 55 having one arm thereof engaged against a fixed pin 55B from the baseblock casting 42 and another arm thereof engaged in a complementary slot 55A on the lens holding member 39 is provided for resiliently biasing the lens holding member 39 to rotate in a counterclockwise direction to return the lens holding member 39 to its initial position subsequent to the lens holding member being rotated by the latch and actuator member 57.

Referring now to a cross-sectional view of FIG. 5 there can be seen to be stationed forward of the baseblock 42, a lens plate 91 having a scene light admitting aperture 93 therethrough in general optical alignment with the photocell 54. An infrared filter 95 is fixedly stationed within the aperture 93 so as to filter scene light admitted to the photocell 54 by way of the secondary sweep photocell apertures 50 and 52. Forward of the infrared filter 95, there is provided a photometer lens 97 for receiving scene light from an opening 99 in the camera housing.

An artificial light source 124 is fixedly disposed above the infrared filter 95 in a complementary opening in the lens plate 91. The artificial light source 124 is preferably a light emitting diode (LED) and provides light to the photoresponsive element 54 by way of a passageway 103 as defined between the lens plate 91 and the baseblock casting 42. In this manner, means are provided for directing light from the LED 124 to the photoresponsive element 54 without filtering the infrared light from the LED 124. As is readily apparent, the shutter blade elements 36 and 38 extend into the passageway 103 to block the light from the LED 124 from reaching the photoresponsive element 54. The shutter blade elements 36 and 38 are provided respectfully with a fourth pair of apertures 119 and 121 which may be moved into overlapping relationship with respect to each other to admit the light from the LED 124 to the photoresponsive element 54 at the initiation of the exposure interval in a manner as will be more fully described in the following discussion.

Figure 6:
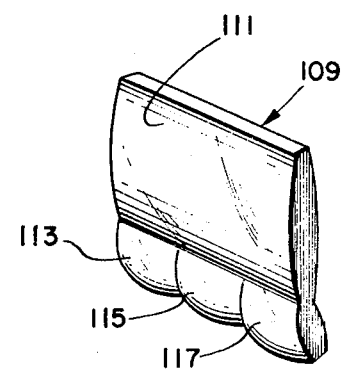
FIG. 6 is a perspective view showing the lens arrangement of FIG. 5.

The camera apparatus 10 also includes a viewfinder as shown generally at 105 of the reversed Galilean telescope type as is more fully described in U.S. patent application Ser. No. 929,840 entitled "Trim Viewing Mechanism", by B. Johnson. The viewfinder 105 is disposed within an elongated hollow housing 89 and includes an objective negative lens 107 disposed at the forward open end of the housing 89 which is optically structured to form a virtual image of a scene which is generally coextensive with the scene to be photographed by way of the camera objective lens arrangement 12. A multi-focus integral eye lens 109 is fixedly stationed for viewing the virtual image of the scene to be photographed by way of an eye relief aperture 123 at the rear of the viewfinder housing 89. The multi-focus integral eye lens 109 comprises a primary viewfinder positive eye lens portion 111 aligned along the optical axis of the objective lens 107 for viewing the scene to be photographed in a well-known manner. Below the primary viewfinder eye lens portion 111, there are provided three smaller eye lens portions 113, 115 and 117 as best shown in FIG. 6. The eye lens portion 113 is aligned to accommodate viewing of the light from the LED 124 for reasons which will become more apparent from the following discussion. Another eye lens portion 115 provides a visual indication of the camera trim mechanism in a manner as is more fully described in U.S. patent application, Ser. No. 929,840, supra. The last of the eye lens portions 117 provides no immediate function but may be easily adapted to provide a third indicator to the photographer should such a function become desirable.

The camera is preferably provided with an integral electronic flash or strobe as shown schematically in FIG. 1 at 112. The strobe charging and triggering circuitry may be of a type well known in the art as is more fully disclosed in U.S. Pat. No. 4,064,519, entitled "Regulated Strobe for Camera with Sixth Flash Inhibit" issued Dec. 20, 1977 in common assignment herewith. The strobe 112 preferably derives charging power from a battery that is insertable within the camera in correspondence with the film pack or cassette in a manner that is well known in the art for Polaroid SX-70-type film cassettes and cameras.

The aforementioned film cassette battery is also preferably utilized to power the circuitry in FIG. 1 in its entirety by way of three switches $S_1$, $S_2$, and $S_3$ in a manner as is more fully described in U.S. Pat. No. 4,040,072, supra. The camera of this invention is also provided with an exposure and sequencing circuit 114 and a motor and solenoid control circuit 116 which operate in a manner also more fully described in U.S. Pat. No. 4,040,072, supra. As is readily apparent, the motor and solenoid control circuit 116 operates to control the energizing current delivered to the solenoid 74 and to a motor 118. The film units intended for use with the camera of this invention are preferably of the self-developing type and the motor 118 is provided to effect the advancement and processing of the self-developing film units in a well-known manner.

Figure 8:
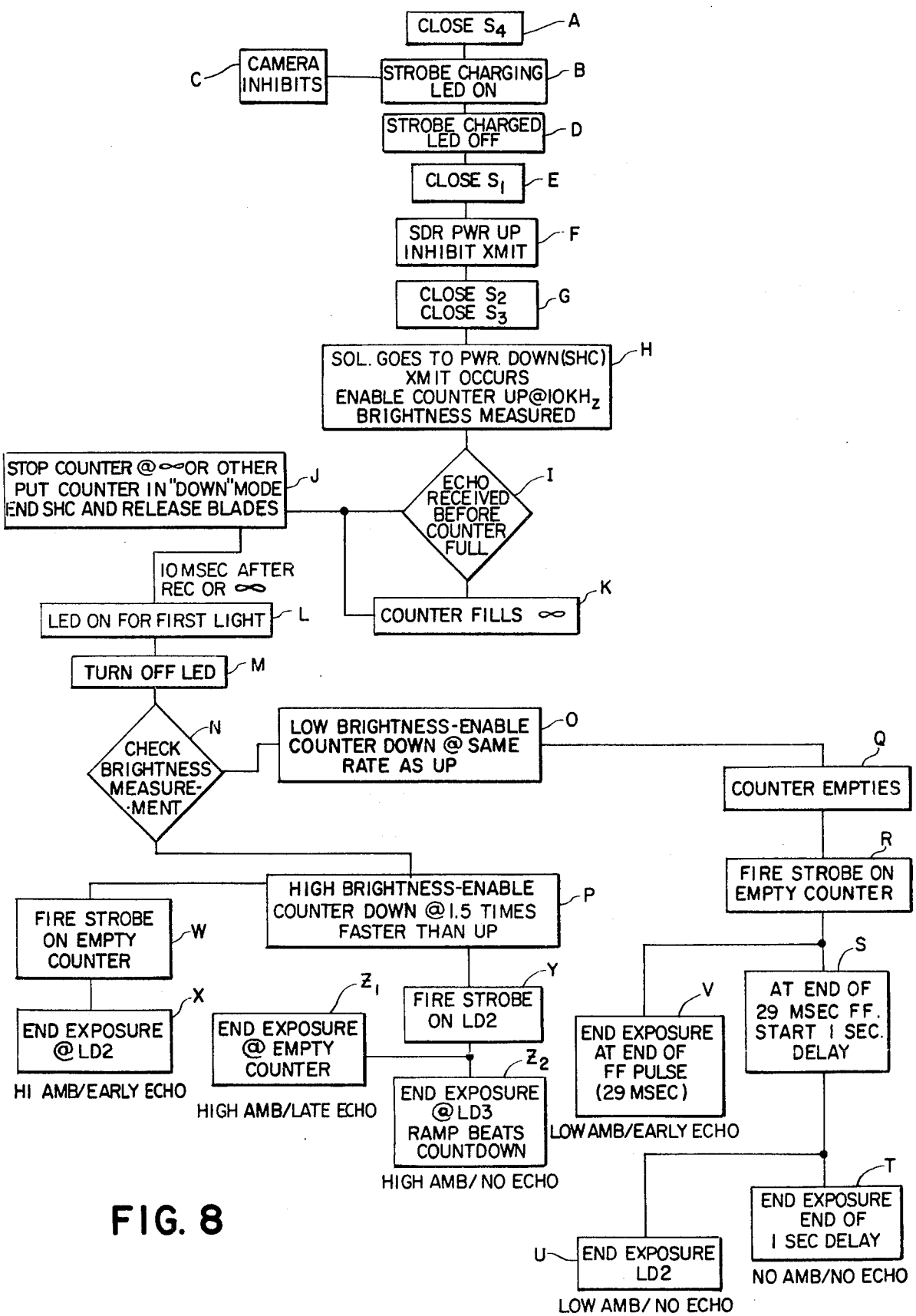
FIG. 8 is a flow chart showing an automatic sequence of operations for the exposure control apparatus of FIG. 1.

Referring now to FIG. 8 in conjunction with FIG. 1, there is shown a sequence of operations through which the camera is automatically guided to provide artificial illumination by way of the strobe 112 under varying conditions of ambient light intensity and camera-to-subject distance range. In order for a photographer to commence a photographic exposure cycle, he must first energize the strobe 112 by manually actuating a strobe charge button 120 (Block A) so as to close switch $S_4$ and effect the charging of the strobe 112 in a well-known manner. During the time that the strobe 112 is charging (Block B), a logic 0 signal level is provided by the strobe 112 to one input terminal, Strobe Charge, of an exclusive OR gate 120. During the strobe charge time, the other input terminal, Delayed Rec. to the exclusive OR gate 120 is also maintained at a logic 0 signal level for reasons which will become more apparent from the following discussion. Thus, the exclusive OR gate 120 provides a logic 0 output signal level which is directed to a NOR gate 123. The other input terminal FL to the NOR gate 123 is also maintained at a logic 0 signal level for reasons which will also become more apparent from the following discussion. Therefore, the output from the NOR gate 123 is switched at a logic 1 signal level so as to energize the LED 124 (Block B) during the time required for the strobe 112 to become fully charged.

The light from the LED 124 is made visible to the photographer from the viewfinder 105 by way of the eye lens 113 and thus provides him with a visual indication that the strobe 112 is in a state of charging and that the photographic cycle initiating button 40 should not be depressed. However, if the photographer should try to actuate the photographic cycle initiating button 40 prematurely prior to the strobe 112 reaching its fully charged condition while the LED 124 is energized, there may be provided a system for inhibiting the operation of the camera in a manner as is more fully described in U.S. Pat. No. 4,064,519, supra, as indicated in Block C, FIG. 8.

When the strobe 112 is fully charged in readiness for a photographic exposure cycle, there is provided a logic 1 level output signal to the exclusive OR gate 120 thereby switching the output from the exclusive OR gate 120 from a logic 0 signal level to a logic 1 signal level. This, in turn, switches the output from the NOR gate 123 from a logic 1 signal level to a logic 0 signal level thereby turning off the LED 124 (Block D).

Once the LED 124 is deenergized, a photographer may initiate a photographic exposure cycle by manually actuating the button 40 so as to close the switch $S_1$ (Block E) in the manner as fully described in U.S. Pat. No. 4,040,072, supra. Closure of the switch $S_1$ energizes the exposure sequencing circuit 114 while simultaneously providing a logic 1 input signal level to one input terminal $S_1$ of an AND gate 126. The AND gate 126 has two other input terminals which at the instant of $S_1$ closing are also at logic 1 signal levels. One of the other input signals to the AND gate 126 at input terminal $\overline{LED}$ is derived from the LED 124 by way of an inverter 128 while the other input signal to the AND gate 126 at input terminal $S_3$ is derived from the open switch $S_3$ by way of another inverter 130. Thus, the output from the AND gate 126 is switched to a logic 1 signal level upon closure of the switch $S_1$. The output from the AND gate 126, in turn, is directed to an OR gate 132 so as to switch the output from the OR gate to a logic 1 signal level thereby providing a solenoid drive signal by way of a line $SDR_2$ to the motor and solenoid control circuit 116. The motor and solenoid control circuit 116, in turn, energizes the solenoid 74 (Block F) to retract the plunger 76 inwardly and rotate the walking beam 62 in a counterclockwise direction from its position as shown in FIG. 2 to its position as shown in FIG. 3A. During this counterclockwise rotation, the leading edge of the walking beam 62 engages the pin 19 of the accelerator member 17 so as to rotate the accelerator member 17 in a counterclockwise direction against the yieldable bias of the spring 21. The leading edge of the accelerator member 17, in turn, engages the right angle tab portion 51 so as to rotate the lens pawl 20 in a counterclockwise direction about its pivot pin 45 from its position shown in FIG. 2 to its position shown in FIG. 3A.

Referring now to FIG. 3A it can also be seen that the walking beam 62 has been rotated in a counterclockwise direction so as to displace the trailing edge 65 thereof out of engagement with the latching tang 61. The latch and actuator member 57 is thereafter rotated in a counterclockwise direction about its pivot pin 59 by the downward movement of the actuator arm 110 which results directly from the aforementioned manual actuation of the button 40 in the manner as is fully described in U.S. Pat. No. 4,040,072, supra. In this manner, the latch and actuator member 57 is rotated in a counterclockwise direction from its position as shown in FIG. 3A to its position as shown in FIG. 3B so as to allow the subsequent rotation of the walking beam 62 in a clockwise direction toward its maximum aperture defining position. Movement of the actuator arm 110 in the downward direction effecting release of the latch and actuator member 57 also operates to simultaneously effect the closing of the switches $S_2$ and $S_3$ (Block G) in a manner as is again fully described in U.S. Pat. No. 4,040,072, supra.

Counterclockwise rotation of the latch and actuator member 57 also operates to cause the leading edge of the latch and actuator member 57 to impact upon the lens holding member pin 71 so as to rotate the lens holding member 39 and its associated lens elements 37A–37D in a counterclockwise direction about the pivot pin 41 thereafter sequentially moving each of the lens elements 37A–37D into focal positions overlapping the light entry exposure opening 48 as best shown in FIG. 3B.

Closure of the switch $S_3$, in turn, operates to power down the solenoid 74 from the initial high current energization condition required to retract the plunger 76 to a low current energization condition (Block H) required to hold the plunger in its retracted position as shown in FIG. 3. The powering down of the solenoid 74 to a holding current mode (SHC) is accomplished as follows. Closure of the switch $S_3$ provides a logic 1 signal level to the inverter 130 which, in turn, provides a logic 0 signal level to the input terminal $S_3$ of the AND gate 126. This, in turn, switches the output of the AND gate 126 from a logic 1 signal level to a logic 0 signal level thereby switching the output from the OR gate 132 from a logic 1 signal level to a logic 0 signal level so as to eliminate the solenoid drive signal along the line $SDR_2$ to the motor solenoid control circuit 116. At the same time, a solenoid hold signal (SHC) is provided by the logic 1 signal level from the closed switch $S_3$ which operates to switch an AND gate 134 from a logic 0 output signal level to a logic 1 output signal level. The other input signal level to the AND gate 134 is derived from an inverter 137 and is already at a logic 1 signal level for reasons which will become apparent from the following discussion. Thus, the output logic 1 signal level from the AND gate 134 operates to switch an OR gate 136 to provide a logic 1 output signal level therefrom to the motor and solenoid control circuit 116 along a line $SHC_2$.

Powering down the solenoid 74 in the aforementioned manner from a solenoid drive current (SDR) to a solenoid holding current (SHC) also operates to actuate the sonar rangefinder 22 to transmit a sonar ranging signal 30 (Block H) in the following manner. Upon the initial closure of the switch $S_1$, the exposure and sequencing circuit 114 provided a logic 1 solenoid drive signal level along a line $SDR_1$ to an AND gate 138. Whereas the other input signal to the AND gate 138 was already at a logic 0 signal level for reasons which will become apparent from the following discussion, the output signal from the AND gate 138 remained at a logic 0 signal level. The logic 1 solenoid drive signal level from the exposure and sequencing circuit 114 along $SDR_1$ was also directed to an input terminal, SDR, of an OR gate 140. Thus, the output from the OR gate 140 during the high current solenoid drive mode (SDR) subsequent to the closure of the switch $S_1$ and prior to the closure of the switches $S_2$ and $S_3$ operated to provide a logic 1 signal level output to a sonar inhibiting circuit 142 thereby inhibiting transmission of a sonar ranging signal by the sonic rangefinder 22 (Block F).

Closure of the switches $S_2$ and $S_3$ in the aforementioned manner powers down the solenoid 74 into its holding current mode (SHC) of operation and changes the logic 1 output signal level from the exposure and sequencing circuit 114 to the input terminal SDR of the OR gate 140 to a logic 0 output signal level thereby changing the output from the OR gate 140 to a logic 0 signal level so as to remove the inhibit imposed on the sonar rangefinding circuit 22 by the inhibit circuit 142. In this manner, the sonar rangefinding circuit 22 is actuated to issue a transmit commence signal to the sonic transducer 14 (Block H) in correspondence with the rotation of the lens holding member 39 from its close-up focus position to its far distance focus position.

Closure of the switches $S_2$ and $S_3$ in the aforementioned manner to power down the solenoid 74 to its holding current mode (SHC) also operates to enable an up-down counter as shown generally at 144 (Block H) in the following manner. As is readily apparent, the initial condition of the counter 144 is empty and a counter status circuit 146 senses the terminal count of the counter 144 and provides a logic 1 output signal as an indication that the up-down counter 144 is empty. The output from the counter status circuit 146 is directed to an AND gate 148 which, in turn, provides a logic 0 output signal level since the other input terminal REC thereto is at a logic 0 signal level prior to receipt of the ranging signal by the echo detector 32. The logic 0 output signal level from the AND gate 148, in turn, is detected to an OR gate 150. The other input terminal $S_3$ to the OR gate 150 is derived from the switch $S_3$ by way of an inverter 152 and thus assumes a logic 1 signal level prior to the closure of the switch $S_3$ and is thereafter changed to a logic 0 input signal level upon the closure of the switch $S_3$. The up-down counter 144 is disabled by a logic 1 input signal level from the OR gate 150 prior to the closure of the switch $S_3$ while the solenoid 74 is in its current driving mode (SDR) and is thereafter enabled to provide a count by a logic 0 output signal level from the OR gate 150 upon the closure of the switch $S_3$.

The count is provided to the up-down counter 144 by an oscillator 156 which provides a 30 KHz output clock pulse. The 30 KHz output clock pulse from the oscillator 156 is directed simultaneously to a first divider circuit 158 wherein the 30 KHz clock pulse is divided by 3 to provide an output clock pulse of 10 KHz and another divider circuit 160 wherein the 30 KHz clock pulse is divided by 2 to provide a 15 KHz output clock pulse for reasons which will become apparent from the following discussion. The 10 KHz clock pulse is directed to an input terminal, 10 KHz, of an AND gate 162 whereupon the output from the AND gate is directed to an OR gate 164. The AND gate 162 receives at another input terminal $\overline{REC}$ a logic 1 signal level from an inverter 163 prior to the receipt of the ranging signal by the echo detector 32 as will be more fully described in the following discussion. The remaining input terminal SHC to the AND gate 162 receives an input signal from the switch $S_3$ by way of the AND gate 134 and the OR gate 136. Thus, closure of the switch $S_3$ provides a logic 1 signal level to the input terminal SHC of AND gate 162 so as to enable the AND gate 162 to gate the 10 KHz clock pulse to the OR gate 164. The OR gate 164, in turn, gates the 10 KHz clock pulse into the up-down counter 144. The aforementioned logic 1 signal level from the interver 163 is also directed to an up-down terminal of the counter 144 and operates to set the mode of the counter 144 to count "up" prior to receipt of the ranging signal by the echo detector 32. In this manner, the up-down counter 144 is actuated to count up the 10 KHz clock pulse at the instant that the sonar ranging signal is transmitted by the sonar rangefinding circuit 122.

As is readily apparent, movement of the shutter blade mechanism 34 from its position as shown in FIG. 2 to its position as shown in FIG. 3A and 3B also operated to move the third pair of apertures 86 and 88 into overlapping relationship with respect to each other so as to admit scene light to the photoresponsive element 54. The photoresponsive element 54 responds to the incident scene light and provides an output signal to a brightness measurement circuit 166 (Block H). The brightness measurement circuit 166, in turn, provides a logic 0 output signal level if the intensity of the detected scene light is below a determinate level and a logic 1 output signal level if the intensity of detected scene light is above the determinate level. The determinate level above which the brightness measuring circuit 166 provides a logic 1 signal level and below which it provides a logic 0 signal level is preferably established to be 10 Cd/ft$^2$.

The output signal from the brightness measurement circuit 166 is directed to an input terminal BM of a first AND gate 168 which receives a logic 1 signal level upon the measurement of a scene light intensity above 10 Cd/ft$^2$ and an input terminal $\overline{BM}$ of a second AND gate 170 which receives a logic 1 level input signal by way of an inverter 172 upon the measurement of a scene light intensity below 10 Cd/ft$^2$. The output from the brightness measurement circuit 166 is also directed by way of another inverter 174 to an input terminal $\overline{BM}$ of a first AND gate 176 and another input terminal $\overline{BM}$ of a second AND gate 178. The AND gates 176 and 178 thus receive a logic 1 signal level at their respective input terminals by way of the inverter 174 upon the measurement of a scene light intensity below 10 Cd/ft$^2$.

Receipt of the echo signal by the transducer 28 (Block I) signals the echo detector 32 to provide an output signal to trigger a receive echo latch circuit as shown generally at 180. The output from the receive echo latch circuit 180, in turn, is directed to an OR gate 122 and switches the output signal from the OR gate 122 from a logic 0 signal level to a logic 1 signal level upon the receipt of the echo signal by the sonar ranging circuit 22. The logic 1 output signal level from the OR gate 122, in turn, is inverted by the inverter 163 to a logic 0 signal level which in turn gates the AND gate 162 off so as to stop the 10 KHz clock pulse from being counted up by the up-down counter 144 (Block J). The change in the output signal from the inverter 163 from a logic 1 output signal level to a logic 0 output signal level also operates to change the counter 144 from an "up" mode of counting to a "down" mode of counting (Block J).

The output signal from the OR gate 122 is also directed to one input terminal of the AND gate 138 to ready the AND gate 138 to provide a logic 1 output signal level in response to a logic 1 input signal level being provided by the exposure and sequencing circuit 114 along the line SDR$_1$. The logic 1 output signal level from the OR gate 122, in turn, is inverted by the inverter 137 to a logic 0 input signal level to the AND gate 134. The output from the AND gate 134 is thus changed to a logic 0 signal level, in turn, switching the output signal from the OR gate 136 to a logic 0 output signal level. The output from the OR gate 136 is thereafter directed by way of a line SHC$_2$ to the motor and solenoid control circuit 116 to de-energize the solenoid 74 and commence the exposure cycle (Block J).

The output signal from the OR gate 122 is also delayed, preferably by 10 milliseconds, through a delay circuit 184. The delayed signal is thereafter directed to the exclusive OR gate 120 to switch the output therefrom from a logic 1 signal level to a logic 0 signal level. The logic 0 output signal level from the exclusive OR gate 120 is thereafter directed to the NOR gate 123 to switch its output signal level from a logic 0 to a logic 1. The logic 1 output signal level from the NOR gate 123, in turn, energizes the LED 124 for reasons which will become apparent from the following discussion.

In the event that the subject should be located at an infinite distance from the camera which by way of example may be considered to be any distance greater than 30 ft., then the counter 144 will fill and provide a logic 1 output signal level at terminal $\alpha$ (Block K). This logic 1 output signal level from the counter 144, in turn, will be directed to an input terminal $\alpha$ of the AND gate 176 and to another input terminal $\overline{\alpha}$ of the AND gate 178 by way of an inverter 179 for reasons which will become more apparent from the following discussion. The logic 1 output signal level from the filled counter 144 is also directed to another input terminal $\alpha$ of the OR gate 122 so as to switch the output from the OR gate 122 from a logic 0 signal level to a logic 1 signal level in the manner previously described upon receipt of the ranging echo.

As is now readily apparent, either receipt of the echo by the rangefinder 22 or the filling of the counter 144 when subjects are located at infinity operates to terminate the "up" count by the counter 144 while simultaneously de-energizing the solenoid 74 to release the shutter blade elements 36 and 38 to commence an exposure cycle. The LED 124 is thereafter energized to provide light 10 milliseconds after the shutter blade elements are released.

The de-energization of the solenoid 74 operates to release the walking beam 62 for acceleration by the accelerator member 17 in the following manner. The accelerator member 17 is biased by the spring 21 to rotate in a clockwise direction with its depending pin portion 19 engaged to the walking beam 62 so as to accelerate the walking beam 62 to a predetermined velocity. The clockwise rotation of the accelerator member 17 is limited by engagement of the pin 29 against the profile cam 35 of the trim member 31 as previously discussed. The profile cam 35 operates regardless of the position of the trim member 31 to limit the extent of rotation permitted the accelerator member 17 so as to effect the disengagement of the accelerator member 17 from the walking beam 62 prior to the shutter blade elements 36 and 38 reaching a position in which the primary scene light admitting apertures 44 and 46 overlap to admit the first scene light to the focal plane 14. The forward momentum of the shutter blade elements 36 and 38 and their associated mounting means at the instant of release by the accelerator member 17 operates to continue the displacement of the shutter blade elements through the range of progressively varying aperture sizes at substantially the same predetermined velocity to which the shutter blade elements were initially accelerated by the accelerating member 17. The aforementioned tension spring 47 which interconnects the walking beam 62 and lens pawl 20 provides an overcenter spring to the walking beam 62 to counterbalance the friction of the walking beam 62 and its associated shutter blade elements 36 and 38 in order to substantially maintain the predetermined velocity of the blade mechanism as it moves through its range of progressively varying aperture sizes toward the other terminal position as shown in FIG. 4.

As previously discussed, the trim member 31 is provided to give the photographer a degree of overriding personal control through which he may slightly vary the film exposure to account for variations in ambient scene light conditions as well as slight variations in the sensitometric characteristics of the film. The trim member 31 is normally stationed at an intermediate neutral position as shown in FIG. 3 from which it may slide either to the right or to the left to selectively increase or decrease the film exposure in accordance with the personal preference of the photographer. The sliding trim member 31 operates to move the variable density filter 90 in a well-known manner across the photoresponsive element 54 to adjust the amount of scene light permitted to enter the photoresponsive element 54 through the photocontrol secondary apertures 50 and 52. At the same time, sliding motion of the profile cam 35 operates to vary the extent of movement permitted the accelerator member 17 upon accelerating the walking beam 62 thereby affecting a corresponding change in the velocity to which the accelerator member 17 accelerates the walking beam 62 and shutter blade elements 36 and 38. Thus, sliding the trim member 31 towards its extreme left-hand position operates to impose the greatest limitation upon the degree of rotation permitted the accelerator member 17 thereby providing the lowest velocity to which the blades may be accelerated. This reduced shutter blade velocity operates to present a small aperture when the electronic flash 112 is fired at a determinate time subsequent to the commencement of the exposure interval in a manner to be subsequently described, thereby decreasing the film exposure under conditions of low ambient scene light intensity where the electronic flash 112 is normally used. The variable density filter 90 would simultaneously be moved over the photoresponsive element 54 to its extreme position of highest transmittance so as to decrease the exposure time as determined by the photoresponsive control circuit under conditions of high ambient scene light intensity where the electronic flash 112 is used for flash fill-in. Conversely, movement of the trim member 31 to its extreme right-hand position permits the greatest degree of rotation for the accelerator member 17 thereby allowing the walking beam 62 and its associated shutter blade elements 36 and 38 to be accelerated to the highest velocity possible. Such an increase in the shutter blade speed operates to present a larger aperture when the electronic flash 112 is fired at a determinate time after commencement of the exposure interval in a manner to be subsequently described, thereby enabling the photographer to increase the film exposure under conditions of low ambient scene light intensity where the source of artificial illumination would normally be used. The variable density filter 90 is simultaneously moved over the photoresponsive element 54 towards its extreme position of least transmittance thereby allowing the least amount of light to reach the photoresponsive element 54 so as to cause an increase in the exposure interval thereby increasing the film exposure under conditions of high ambient scene light intensity where the electronic flash 112 is used for fill flash purposes.

Clockwise rotation of the accelerator member 17 in the aforementioned manner also operates to disengage the pin 25 from the right angle tab portion 51 of the lens pawl 20 so as to permit the lens pawl 20 to be rotated in a counterclockwise direction about its pivot pin 45 under the urging influence of the biasing spring 47. In this manner, the depending tang portion 49 is moved into the locus of travel of the notches 53A through 53D so as to be received within a respective one of the notches 53A through 53D thereby precluding further counterclockwise rotation of the lens holding member 39. In this manner, the lens holding member 39 is stopped in position to index the appropriate lens element over the light entry exposure opening 48 as shown in FIGS. 4 and 7.

Thus, the lens pawl 20 operates in response to the release of the walking beam 62 upon the detection of an echo signal reflected from the photographic subject to interrupt the movement of the lens holding member 39 subsequent to its initial displacement from its closeup focus position at an elapsed time interval between transmission of the sonar ranging signal and receipt of the echo from the photographic subject. The photographic subject will thus be focused in the elapsed time interval (real time) between the transmission of the sonar ranging signal and receipt of the echo of the sonic rangefinder 22. As will be readily understood, the dynamic characteristics of the lens arrangement 12, which include the lens holding member 39, the plurality of lens elements 37A through 37D, and the biasing torsion spring 55, all collectively operate to move the lens elements 37A through 37D through their plurality of focal positions at a rate such that each of the lens elements reaches its focal position in overlapping relation with respect to the exposure opening 48 at substantially the same time in which an echo from the sonar ranging signal would be received by the echo detector 32 subsequent to being reflected from a subject located at the camera-to-subject distance directly corresponding to the focused condition of that particular lens element.

As previously discussed, the walking beam 62 moves through a limited degree of rotation before the primary scene light admitting apertures 44 and 46 overlap to admit the first scene light to the focal plane 14. Whereas the photocell sweep secondary aperture 50 and 52 move in correspondence with the primary apertures 44 and 46, the walking beam 62 rotates through a limited number of degrees before the first scene light is admitted by the secondary apertures 50 and 52 to the photoresponsive element 54.

Figure 7:
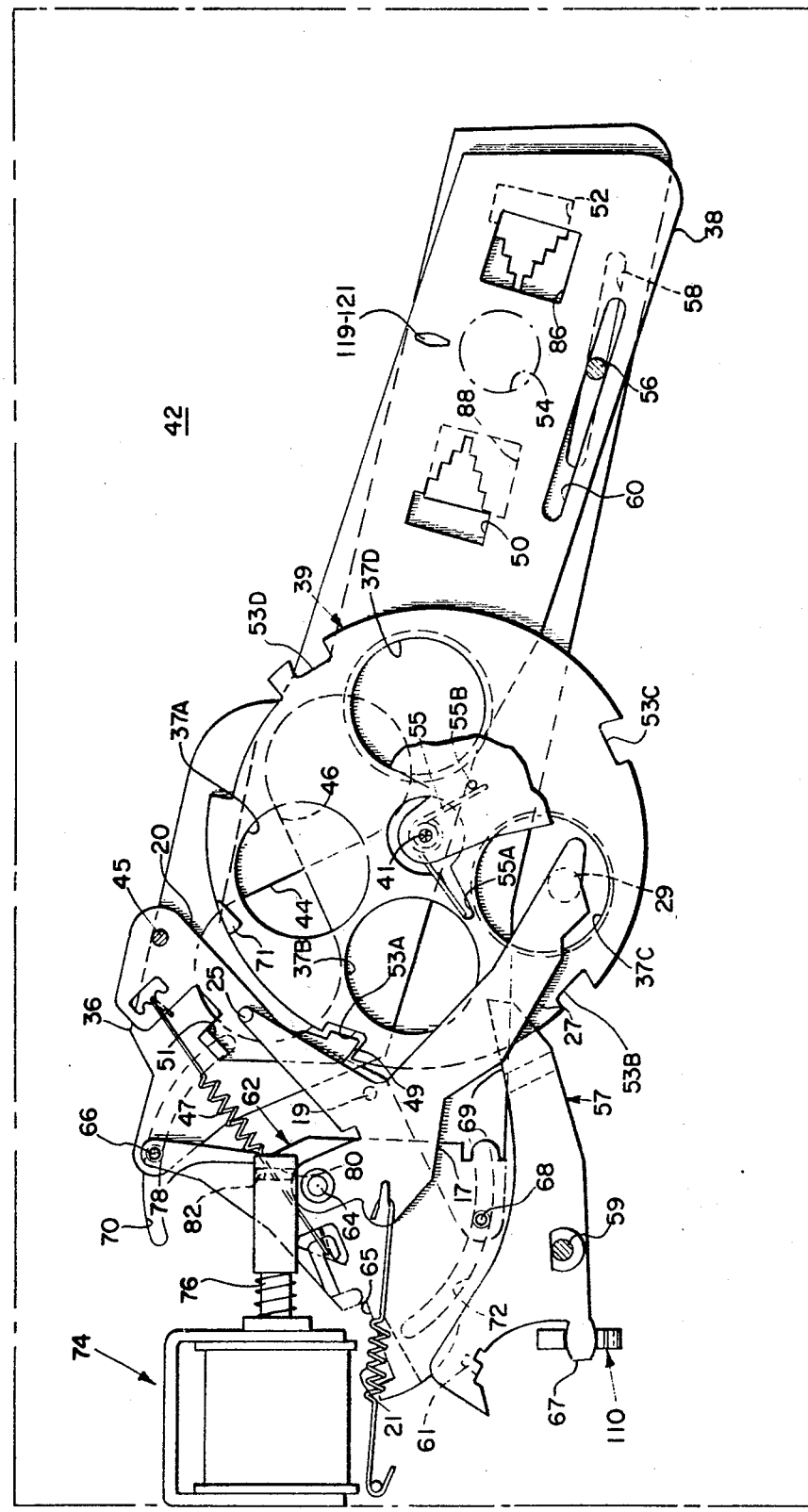
FIG. 7 is a front elevational view showing portions of the shutter blade mechanism of FIG. 2 in still another position.

The LED 124 is aligned with respect to the photoresponsive element 54 on the opposite side of the shutter blade elements 36 and 38 so as to provide illumination detectable by the photoresponsive element 54 when the set of apertures 119 and 121 overlap as shown in FIG. 7 at the instant of initial transmission of scene light through the apertures 44 and 46. As previously described, the LED 124 is energized to provide illumination 10 milliseconds subsequent to the release of the shutter blade elements 36 and 38 (Block L). The 10 millisecond delay in energizing the LED 124 assures that the light from the LED will not be admitted to the photoresponsive element 54 by the third pair of apertures 86 and 88. Thus, regardless of the actual ambient scene light conditions, an indication may be provided as to the first instant at which the primary apertures 44 and 46 overlap to admit scene light to the focal plane 14 by way of the light from the LED 124 being admitted to the photoresponsive element 54 at the instant that the apertures 119 and 121 first overlap.

The photoresponsive element 54 thus responds to the light emitted from the LED 124 at the instant that the second pair of apertures 121 and 119 first overlap to provide an output signal to an integrator circuit 186 by way of a sample and hold circuit 188. The sample and hold circuit 188 samples the output signal from the light responsive element 54 in a well-known manner and thereafter directs the sampled output signal to the integrator circuit 186 unless signaled to hold in a manner to be subsequently described in greater detail herein. The integrator circuit 186 is turned on in coincidence with the LED 124 by way of a switch S$_5$ which opens in response to the receipt of a logic 0 signal level provided by way of an inverter 190 from the 10 millisecond delay circuit 184. In this manner, means are provided for rendering the integrator circuit 186 and its associated level detector circuits LD1, LD2, and LD3 non-responsive to the output of the photoresponsive element prior to the commencement of the exposure interval and, more particularly, during the aforementioned brightness measurement operation. The output from the integrator 186, in turn, is directed to three level detector circuits LD1, LD2, and LD3. The output signal from the level detector LD1 switches from a logic 0 output signal level to a logic 1 output signal level upon the detection of the first light provided by the LED 124. By way of example, the level detector LD1 may be set to trigger upon an input voltage of 0.1 volts.

The logic 1 output signal level from the level detector LD1, in turn, is directed to the NOR gate 123 so as to switch the output therefrom from a logic 1 output signal level to a logic 0 output signal level thereby turning off the LED 124 (Block M).

The output from the level detector LD1 is also directed to the AND gates 168 and 170 to enable one of the AND gates to gate a clock pulse into the counter 144 by way of the OR gate 164 as a result of the previous scene brightness measurement (Block N). As previously discussed, the counter 144 is in a "down" mode and will count down the respective clock pulse provided thereto by the OR gate 164. As is now readily apparent, under low ambient scene light conditions where the scene light intensity is less than 10 Cd/ft$^2$, AND gate 170 will be enabled to gate the 10 KHz clock pulse to the counter 144 and the counter 144 will count down at the same rate at which it previously counted up (Block O). Conversely, under high ambient scene light intensity conditions (above 10 Cd/ft$^2$), the AND gate 168 will be enabled to gate the 15 KHz clock pulse to the counter 144 and will count down at a rate of 1.5 times faster than the rate it previously counted up (Block P).

Under conditions of low ambient scene light intensity of less than 10 Cd/ft$^2$, the counter 144 will empty prior to the output from the light integrator 186 triggering the level detector LD2 (Block Q). When the counter 144 empties, the counter status circuit 146 will switch from a logic 0 output signal level to a logic 1 output signal level thereby providing a logic 1 input signal level to the AND gate 148. The other input signal level at terminal REC to the AND gate 148 is already at a logic 1 signal level by virtue of receipt of the echo signal from the rangefinder 22. Thus, the output signal from the AND gate 148 switches to a logic 1 signal level so as to switch the OR gate 150 to provide a logic 1 output signal therby disabling the counter 144. The logic 1 output signal from the AND gate 148 is also directed to an OR gate 196 which, in turn, switches to a logic 1 output signal level to trigger a flash fire pulse circuit 198. The flash fire pulse circuit 198, in turn, provides a 29 millisecond flash fire pulse to trigger the strobe 112 and fire its associated flash tube in a well-known manner (Block R).

Thus, the counter 144 by counting down the 10 KHz input clock pulse provides a range responsive timed signal commencing in correspondence with the initiation of the exposure interval and terminating at a subsequent time corresponding to the distance between the camera and the subject to be photographed. Means comprising the counter status circuit 146, the AND gate 148, the OR gate 196 and the flash fire pulse circuit 198 cooperatively respond to the termination of this range responsive timed signal (counter empties) to initiate the energization of the source of artificial illumination (strobe). Thus, in this manner are means provided for generating a fire flash signal at a determinate time subsequent to the initiation of the exposure interval.

The output signal from the flash fire pulse circuit 198 is inverted by an inverter 200 and directed to one input of an AND gate 202. The input signal to the flash fire circuit 198 is directed to the other input terminal of the AND gate 202. Thus, the AND gate 202 provides a logic 0 output signal level during the 29 millisecond duration of the flash fire pulse from the flash fire pulse circuit 198. Upon termination of the 29 millisecond flash fire pulse, the AND gate 202 switches to provide a logic 1 output signal level which is directed to respective input terminals of the AND gates 176 and 178.

If the subject were previously determined by the rangefinder circuit 22 to be located at infinity, then the AND gate 176 will be enabled by the logic 1 signal level previously applied to its input terminal α and will switch from a logic 0 output signal level to a logic 1 output signal level upon receipt of the logic 1 output signal level from the AND gate 202. The output signal from the AND gate 176 will be thereafter delayed for one second by a delay circuit 204 so as to provide a delayed logic 1 input signal level to an OR gate 206 (Block S). The OR gate 206, in turn, will switch to a logic 1 output signal level thereby providing a command signal to the motor and solenoid control circuit 116 to energize the solenoid 74 and terminate the exposure operation in a well-known manner (Block T).

However, in the event that sufficient scene light is detected by the photoresponsive element 54 and integrated by the integrator 186 to trigger the level detector LD2, prior to the expiration of the aforementioned 1 sec delay, then the exposure will be terminated prior to the 1 sec delay in the following manner (Block U). When the input voltage to the level detector LD2 reaches its threshold voltage, which by way of example may be 0.7 V, the level detector LD2 switches from a logic 0 output signal level to a logic 1 output signal level thereby providing a logic 1 input signal level to a terminal $\overline{\text{LD2}}$ of an AND gate 214. The input terminal from OR gate 212 to the AND gate 214 is also at a logic 1 signal level by virtue of the AND gate 148 having switched to a logic 1 ouput signal level when the counter status 146 detected an empty counter 144. The AND gate 214 thus provides a logic 1 signal level to switch the OR gate 206 and provide the exposure terminating command signal, as a result of the triggering of the level detector LD2 prior to the expiration of the aforementioned 1 sec delay. Conversely, if the photographic subject is determined by the rangefinder circuit 22 to be located at a distance from the camera less than infinity, then the AND gate 178 will enabled to provide a logic 1 output signal level immediately upon receipt of the logic 1 output signal level from the AND gate 202 at the termination of the 29 millisecond time delay. A logic 1 output signal level from the AND gate 178 immediately triggers the OR gate 206 to provide the aforementioned exposure terminating command signal to the motor and solenoid circuit 116 (Block V). Thus, under conditions of low ambient scene light intensity of less than 10

Cd/ft², the shutter blade elements 36 and 38 are triggered to close 29 milliseconds subsequent to the initiation of the flash fire pulse when the photographic subject is located at distances of less than infinity from the camera and at one second subsequent to the termination of the flash fire pulse when the photographic subject is located at distances equal to infinity (greater than 30 ft) from the camera. Alternatively, the exposure may be terminated prior to the expiration of the one second timing delay if there is sufficient light to cause the light integrator 186 to trip at the level detector LD2.

Under conditions of high ambient scene light intensity greater than 10 Cd/ft², it can be seen that the brightness measurement circuit 166 provides a logic 1 signal level which enables the AND gate 168 to gate the 15 KHz clock pulse to the OR gate 164 while disabling the AND gate 170 from gating the 10 KHz clock pulse. Thus, the first light that is admitted to the photoresponsive element 54 from the LED 124 operates to trigger the level detector LD1 in the aforementioned manner thereby providing a logic 1 signal level to the input of the AND gate 168 so as to initiate the countdown by the counter 144 in synchronization with the initiation of the film exposure (Block P). In this manner, there is provided a range responsive timed signal commencing in correspondence with the initiation of the exposure interval and terminating at a subsequent time corresponding to the distance between the camera and the subject to be photographed.

In the event that the photographic subject is located close enough to the camera that the counter 144 counts down to empty prior to the output signal from the integrator circuit 186 triggering the level detector LD2, there will occur a change in the output from the counter-status circuit 146 from a logic 0 signal level to a logic 1 signal level as previously discussed. The logic 1 output signal level from the counter status circuit 146 switches the output from the AND gate 148 to a logic 1 output signal level which, in turn, disables the counter 144 in the aforementioned manner.

The output from the AND gate 148, in turn, switches the output from the OR gate 196 to a logic 1 output signal level thereby actuating the flash fire pulse circuit 198 to provide the flash fire pulse to the strobe 112 (Block W). At the same instant that the strobe 112 is fired, there is also actuated a hold pulse circuit 216 which provides a one millisecond holding pulse to the sample and hold circuit 188 by way of an inverter 217.

As previously discussed, prior to the receipt of the holding pulse from the hold pulse circuit 216, the sample and hold circuit 188 operates to sample the output voltage from the light responsive element 54 and to transfer the sampled output voltage directly to the integrator circuit 186. The inverted logic 0 output signal level from the inverter 217 operates to change the mode of the sample and hold circuit 188 from one of sampling to one of holding. Thus, the sampled voltage from the scene light responsive element 54 at the instant prior to the output of the inverter 217 changing from a logic 1 signal level to a logic 0 signal level is held for the one millisecond duration of the holding pulse. The integrator 186 continues to receive the voltage held by the sample and hold circuit 188 regardless of the actual change in voltage from the scene light responsive element 54, and in this manner discounts the artificial illumination provided by the strobe 112. The one millisecond duration of the holding pulse is chosen to be slightly less than the duration of the light pulse from the strobe 112.

Subsequent to the expiration of the one millisecond hold pulse from the hold pulse circuit 216, scene light integration continues and ultimately triggers the level detector LD2 to provide a logic 1 output signal level to the terminal LD2 of the AND gate 214. The logic 1 input signal level to the other input terminal of the AND gate 214 is derived from the OR gate 212 which was previously gated to provide a logic 1 signal from AND gate 148 when the counter 144 emptied. Thus, the AND gate 214 provides a logic 1 output signal level to the OR gate 206 which in turn provides a logic 1 output signal level to command the motor and solenoid control circuit 116 to energize the solenoid 74 and thereby terminate the exposure interval (Block X).

In this manner, means are provided for discounting the artificial illumination provided by the strobe 112 so that a select proportion of the optimum film exposure value is directly provided by ambient scene light while the remaining proportion of the optimum film exposure value is directly attributable to the artificial scene light provided by the strobe 112. In the illustrated embodiment 30 percent of the film exposure may be directly attributable to the artificial scene light provided by the strobe 112 while 70 percent of the film exposure may be directly attributable to the ambient scene light. These proportions are established, for example, by the 0.7 volt trigger level of the level detector LD2 and a 1.0 volt trigger level for another level detector LD3. In other words, level detector LD3 which may be triggered at 1 volt represents an optimum film exposure value so therefore by terminating the exposure interval upon the triggering of level detector LD2 at 0.7 volts subsequent to discounting the artificial illumination provided by the strobe 112 insures that at least 30 percent of the optimum film exposure will be provided by the artificial light from the strobe 112.

Also, it should be readily appreciated that by counting down at the faster clock rate of 15 KHz, there is provided a decrease in the duration of the range responsive timed signal by a constant factor (1.5) in response to a high ambient scene light intensity above 10 Cd/ft². The decrease in the duration of the range responsive timed signal effects the firing of the strobe 112 at a shorter time subsequent to the commencement of the exposure interval than the time at which the strobe 112 would otherwise be fired under conditions of low ambient scene light intensity of less than 10 Cd/ft². Whereas the opening speed for the shutter blade elements 36 and 38 is generally constant, it is readily apparent that the strobe 112 is fired sooner and at a smaller aperture during the high ambient scene light intensity mode of operation than during the aforementioned low ambient scene light intensity mode of operation. Preferably, the strobe 112 is fired at a determinate number of smaller aperture stops during the high ambient scene light intensity mode of operation than it would be during the low ambient scene light intensity mode of operation for a subject located at the same distance from the camera.

Photographic subjects may be located at too great a distance from the camera to maintain the aforementioned proportion between ambient and artificial scene light, in which case there is provided a so-called transient mode of operation where the level detector LD2 will be triggered to provide a logic 1 output signal level prior to the counter 144 emptying. In this situation, the integrator circuit 186 will trigger the level detector LD2 to provide a logic 1 output signal level which in turn will trigger the OR gate 196 to provide a logic 1 output signal level, in turn, actuating the flash fire pulse circuit 198 to fire the strobe 112 in the aforementioned manner (Block Y). Simultaneous with the strobe 112 firing, the hold pulse circuit 216 will be actuated in the aforementioned manner to switch the sample and hold circuit 188 from its sampling to its holding mode thereby controlling the integrator 186 to discount the artificial illumination provided by the strobe 112.

In the event that the photographic subject is located close enough to the camera that the counter 144 empties, prior to the scene light integrator triggering the level detector LD3, there will be provided a logic 1 input signal level to the OR gate 212 which operates in conjunction with the logic 1 output signal level from the level detector LD2 to switch the AND gate 214 to a logic 1 output signal level, in turn, switching the OR gate 206 to provide the exposure terminating command signal to the motor and solenoid control circuit 116 (Block $Z_1$).

Conversely, if the photographic subject is located at such a great distance from the camera that the level detector LD3 will be triggered by the output signal from the integrator 186 prior to the counter 144 emptying, then there will be provided a logic 1 output signal level to the OR gate 212 which, in turn, will provide a logic 1 input signal level to the AND gate 214 which, in turn, will trigger to provide a logic 1 input signal level to the OR gate 206 thereby providing the exposure terminating command signal to the motor and solenoid control circuit 116 (Block $Z_2$). As should be readily apparent, during this transient mode of operation, the proportion of the film exposure value directly attributable to the artificial scene light provided by the strobe 112 decreases from the aforementioned 30 percent in direct correspondence with the increase in the subject-to-camera distance range until the artificial scene light provides no contribution to the film exposure which is the situation when the level detector LD3 switches to provide the exposure terminating command signal prior to the counter 144 emptying.

As is readily apparent, the exposure terminating command signal operates to energize the solenoid 74 and rotate the walking beam 62 in a counterclockwise direction to its extreme terminal position as shown in FIGS. 3A and 3B. During the counterclockwise return movement of the walking beam 62, the leading edge thereof engages the pin 19 of the accelerator member 17 so as to rotate the accelerator member 17 in a counterclockwise direction. Counterclockwise rotation of the accelerator member 17, in turn, operates ultimately to move its pin portion 25 into engagement with the right angle tab portion 51 of the latch member 20 so as to rotate the latch member 20 at a clockwise direction about its pivot pin 45 thereby moving the depending tang portion 49 out of engagement with the respective one of the notches 53A through 53D to which it was engaged. In this manner, the lens holding member 39 is released to be rotated back to its initial position as shown in FIG. 2 under the yieldable influence of its biasing spring 55.

The latch and actuator member 57 is thereafter rotated in a clockwise direction about its pivot pin 59 back to its initial position as shown in FIG. 2 by the upward movement of the actuator arm 110 in a manner as is more fully described in U.S. Pat. No. 4,040,072, supra. After the latch and actuator member 57 is moved into its latching position as shown in FIG. 2, the solenoid 74 is de-energized and releases the walking beam 62 for limited rotation in a clockwise direction in the aforementioned manner by the accelerator member 17 until the edge 65 of the walking beam 62 engages the latching tooth 61 as shown in FIG. 2.

Other embodiments of the invention, including additions, subtractions, deletions and other modifications of the preferred disclosed embodiments of the invention will be obvious to those skilled in the art and are within the scope of the following claims.

What is claimed is:

1. A camera having means for defining a focal plane, said camera comprising:
    a plurality of discrete lens elements each having a different focal length;
    means for holding said plurality of lens elements in circumferentially spaced apart relation with respect to each other for rotation about a center axis, rotation of said lens holding means from an initial position operating to sequentially move each of said lens elements into position to focus an image onto the camera focal plane of a photographic subject located at a different camera-to-subject distance;
    a blade mechanism;
    means for mounting said blade mechanism for movement between one arrangement in which said blade mechanism blocks scene light from being transmitted to the film plane and another arrangement in which said blade mechanism unblocks the passage of scene light to the film plane;
    actuable drive means for displacing said blade mechanism between its said one and other positions to define a photographic exposure interval; and
    means for latching said blade mechanism in its said scene light blocking arrangement and for rotatably driving said lens holding means to sequentially move each of said lens elements into its said focus position, said blade latching and lens driving means being movable from one blade mechanism latching position to another blade mechanism unlatching position to enable said drive means to displace said blade mechanism from its said scene light blocking arrangement to its said scene light unblocking arrangement to define said exposure interval, said movement of said blade latching and lens driving means from its said blade mechanism latching position to its said blade mechanism unlatching position simultaneously operating to actuate said lens holding means so as to rotatably drive said lens holding means to sequentially move each of said lens elements into its said focus position.

2. The camera of claim 1 wherein said blade latching and lens driving means comprises a member disposed for displacement between one position wherein said member overlaps the locus of travel of said blade mounting means to inhibit movement of said blade mechanism from its said scene light blocking arrangement to its said scene light unblocking arrangement and another position wherein said member is out of the locus of travel of said blade mounting means to allow movement of said blade mechanism from its said scene light blocking arrangement to its said scene light unblocking arrangement.

3. The camera of claim 2 further comprising means for receiving a source of electrical energy and manually actuable means energizable in part by the source of electrical energy for actuating said drive means to initiate said photographic exposure interval and for driving said blade latching and lens driving member from its said one blade latching position to its said other blade unlatching position, said blade latching and lens driving member operating during its said movement from its said one position to its said other position to engage and rotatably accelerate said lens holding means so as to sequentially move each of said lens elements into its said focus position.

4. The camera of claim 3 wherein said blade latching and lens driving member is disposed for rotation between its said first latching position and its said other unlatching position.

5. The camera of claim 2 wherein: said blade mechanism comprises scanning shutter blade elements and said blade mounting means comprises a rotatably disposed walking beam for imparting general reciprocal sliding movement to said shutter blade elements; and said blade latching and lens driving member operates when in its said one latching position to overlap the locus of rotation of said walking beam so as to inhibit rotation of said walking beam from its said scene light blocking arrangement to its said scene light unblocking arrangement without inhibiting movement of said walking beam from one position in its said scene light blocking arrangement wherein said walking beam inhibits movement of said blade latching and lens driving member from its said one latching position to its said unlatching position, and another position in its said scene light blocking arrangement wherein said walking beam allows movement of said blade latching and lens driving member from its said one latching position to its said other unlatching position.

6. The camera of claim 5 wherein said latching and lens driving member is disposed for rotation between its said first latching position and its said other unlatching position, said blade latching and lens driving member operating during its said rotation from its said one position to its said other position to engage and rotatably accelerate said lens holding means so as to sequentially move each of said lens elements into its said focus position.

7. The camera of claims 1 or 2 further comprising means for generating and transmitting a sonar ranging signal and for providing an indication upon detection of an echo signal reflected from a photographic subject at an elapsed time subsequent to the transmission of the sonar ranging signal wherein said blade latching and lens driving means operates to unlatch said blade mechanism and drive said lens holding means to sequentially move each of said lens elements into its said focus position in correspondence with the transmission of said sonar ranging signal.

* * * * *